(12) United States Patent
Henning et al.

(10) Patent No.: US 7,409,498 B2
(45) Date of Patent: Aug. 5, 2008

(54) SCALED COERCION OF DISK DRIVE CAPACITY

(75) Inventors: Brett Henning, Colorado Springs, CO (US); Lawrence Rawe, Colorado Springs, CO (US); Roy Wade, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 337 days.

(21) Appl. No.: 11/366,921

(22) Filed: Mar. 2, 2006

(65) Prior Publication Data

US 2007/0208909 A1 Sep. 6, 2007

(51) Int. Cl.
*G06F 12/00* (2006.01)
*G06F 13/00* (2006.01)
*G06F 13/28* (2006.01)

(52) U.S. Cl. .................. 711/114; 711/111; 711/112; 711/170; 711/172

(58) Field of Classification Search .................. 711/114
See application file for complete search history.

(56) References Cited

U.S. PATENT DOCUMENTS

| | | | | |
|---|---|---|---|---|
| 5,651,133 | A * | 7/1997 | Burkes et al. | 711/114 |
| 6,192,448 | B1 * | 2/2001 | Mansur | 711/112 |
| 6,446,156 | B1 * | 9/2002 | Chia et al. | 711/4 |
| 7,146,463 | B2 * | 12/2006 | Mukker et al. | 711/114 |

* cited by examiner

*Primary Examiner*—Donald Sparks
*Assistant Examiner*—Ryan Bertram
(74) *Attorney, Agent, or Firm*—North Weber & Baugh LLP

(57) ABSTRACT

The present invention provides disk coercion by generating coercion percentages or values that can be used to coerce various disks according to each disk's particular labeled size or capacity. In one embodiment, a disk size is received and a base coercion scaling factor is provided such that the received disk size is coerced according to the base coercion scaling factor if the labeled disk capacity is below a disk size threshold. The coercion scaling factor increases for labeled disk capacity above the disk threshold. If the labeled disk capacity is above the disk size threshold, then a coercion scaling factor is provided according to the rate of increase of coercion scaling factors and the labeled disk capacity.

22 Claims, 5 Drawing Sheets

SCALED COERCION OF DISK DRIVE CAPACITY

BACKGROUND

A. Technical Field

The present invention relates generally to storage devices, and more particularly, to the method for defining capacity for a disk drive.

B. Background of the Invention

Disk arrays comprising multiple disk drives have emerged as a low cost alternative to the use of single large disks for non-volatile storage of information. The disk array when coupled to a host system, offers great improvements in performance, reliability, power consumption and scalability over a single large magnetic disk. An example of such a disk array is a Redundant Array of Independent Disks (hereinafter "RAID"). The use of multiple drives within such an array allows the recordation of redundant information on the disk drives so that lost data may be reconstructed in the event of a drive failure. Although the data may be recovered, a failed drive is often required to be replaced by a new physical disk drive.

The new drive may vary slightly in capacity as compared to the earlier failed drive. This slight capacity difference is due to the fact that the new drive may be purchased from different vendors or the model of the new drive may be different than the earlier drive which failed. For example, a 36 GB drive from one vendor may have slightly less or more capacity than 36 GB from a second vendor even if both vendors advertise the size of the drive to be of 36 GB capacity. This may also be true for the drives coming from the same vendor but possessing different models. Accordingly, when a drive of 36 GB fails, and is replaced by a new 36 GB drive of a different model or from a different vendor; the new drive may not have exactly 36 GB of capacity but vary by a fraction.

The variation in drive size by some fraction may lead to errors when large number of drives are used in an array thereby making overall volume of storage system to be slightly variant (approximately 2-3%) from the expected volume. When constructing or repairing a RAID, it is important to consider the actual size/capacity of the disks that are to be located within the array. If there are any size mismatches, then the array may not operate properly.

Prior art disk coercion techniques, such as the method shown in FIG. 1, are used to ensure disk capacity matches within the array. Disk coercion 101 may be basically described as an input/output algorithm wherein the disk size 102 is given as an input to obtain the coerced disk size 103 as an output. The disk size may also be provided as a block count 105 to get the coerced value of the respective block count 106. Disk coercion or drive coercion forces the drives within an array to use less than their full capacity so that when a drive fails and has to be replaced and if the replacement drive happens to be smaller, it is easily accommodated within the slightly reduced space on the disk. In principle, the coercion phenomenon forces the larger drives to use only the amount of capacity available on the smallest drive within the array. For instance in a RAID volume of 36, 35.7 and 36.5 GB drives, the 36 and 36.5 GB drives will be forced to use only 35.7 GB of their space.

The difficulty with prior art coercion techniques is identifying an appropriate coercion factor that reduces the available disk capacities below the smallest drive. One method that is used is coercing a disk within the array by a certain percentage factor, such as 2%, to ensure that its perceived capacity is smaller than the smallest disk within the array. However, as disk capacities within an array increase, the percentage factor may coerce the disk capacity by too little causing coercion to be ineffective.

A boundary based coercion method may be used which may allow an option to map out a reserved space to compensate for slightly smaller drive sizes that may be added later. In the boundary-based coercion, multiple disks are analyzed and their capacities are rounded down to an arbitrary boundary. However, such algorithms also lead to the size-matching problem as explained earlier. Further, as the difference between the size of the drive and the boundary increases, the amount of non-utilized storage and RAID inefficiencies increases.

SUMMARY OF THE INVENTION

The present invention provides disk coercion by generating coercion percentages or values that can be used to coerce various disks according to each disk's particular labeled size or capacity. In one embodiment, a disk size is received and a base coercion scaling factor is provided such that the received disk size is coerced according to the base coercion scaling factor if the labeled disk capacity is below a disk size threshold. The coercion scaling factor increases for labeled disk capacity above the disk threshold. If the labeled disk capacity is above the disk size threshold, then a coercion scaling factor is provided according to the rate of increase of coercion scaling factors and the labeled disk capacity. The rate of increase in the coercion scaling factor is identified in order to provide increased coercion scaling factors for disks that are relatively larger. For example, a disk with size larger than the disk size threshold is coerced by the increased coercion scaling factor relative to that particular disk size whereas disk sizes below the threshold are coerced by said base coercion scaling factor.

In one embodiment, the present invention has a bit counter that can be used to calculate a bit count wherein a maximum logical block address (hereinafter "LBA") of the disk drive is identified and the position of the most significant bit '1' is counted and stored as the bit count. A scaling factor is identified and the bit count is divided by the scaling factor to obtain an initial divisor. The initial divisor is further adjusted to obtain a final divisor that can be used to obtain a coercion percentage. The coercion percentage is further used to coerce the received disk size.

As per one embodiment of the present invention, the bit count may be adjusted to identify a base value that can be increased or decreased causing the coercion values to start at smaller or larger numbers respectively. Further, the rate at which the scaling factor increases may be changed. A larger scaling factor rate will cause the calculated coercion value of a disk to increase at a slower rate, while a smaller scaling factor will cause the opposite. The rate of increase in the coercion scaling factor may be applied as various functions such as a linear function or a step function. Furthermore, the initial divisor may be increased or decreased to obtain a final divisor that can be used to create a coerced disk size as per the requirement of the required RAID volume.

The present invention may be implemented in software or firmware for providing disk coercion of almost all size of disks. For a small disk, the amount of space used to preserve disk capacity may be minimized, whereas for a larger disk, larger amount of space may be used to deal with larger differences in drive capacities.

Other objects, features and advantages of the invention will be apparent from the drawings, and from the detailed description that follows below.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

An apparatus and method for scaled coercion of hard disk drive capacities are described. In one embodiment, different coercion values are generated depending on the size of the disk drive. Amongst the various coercion values, one value is defined as the base coercion scaling factor that may be used to coerce the disk having size less than or equal to a threshold disk size. At the disk size threshold, the coercion scaling factor starts to increase at a particular rate(s) and a disk having a size larger than the disk size threshold may be coerced by using a corresponding increased coercion scaling factor.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different computing systems and devices. The embodiments of the present invention may be present in hardware, software or firmware. The present invention may also be implemented as a computer program product embodied on a computer readable medium comprising instructions for carrying out the scaled coercion method disclosed herein. The best mode of the invention described in the specification illustrates the exemplary embodiment of the invention. It is understood that one skilled in art may modify or change the data used in the best mode of invention.

Reference in the specification to "one embodiment" or "an embodiment" means that a particular feature, characteristic, or function described in connection with the embodiment is included in at least one embodiment of the invention. The appearances of the phrase "in one embodiment" in various places in the specification are not necessarily all referring to the same embodiment.

A. Overview

Figure 1:
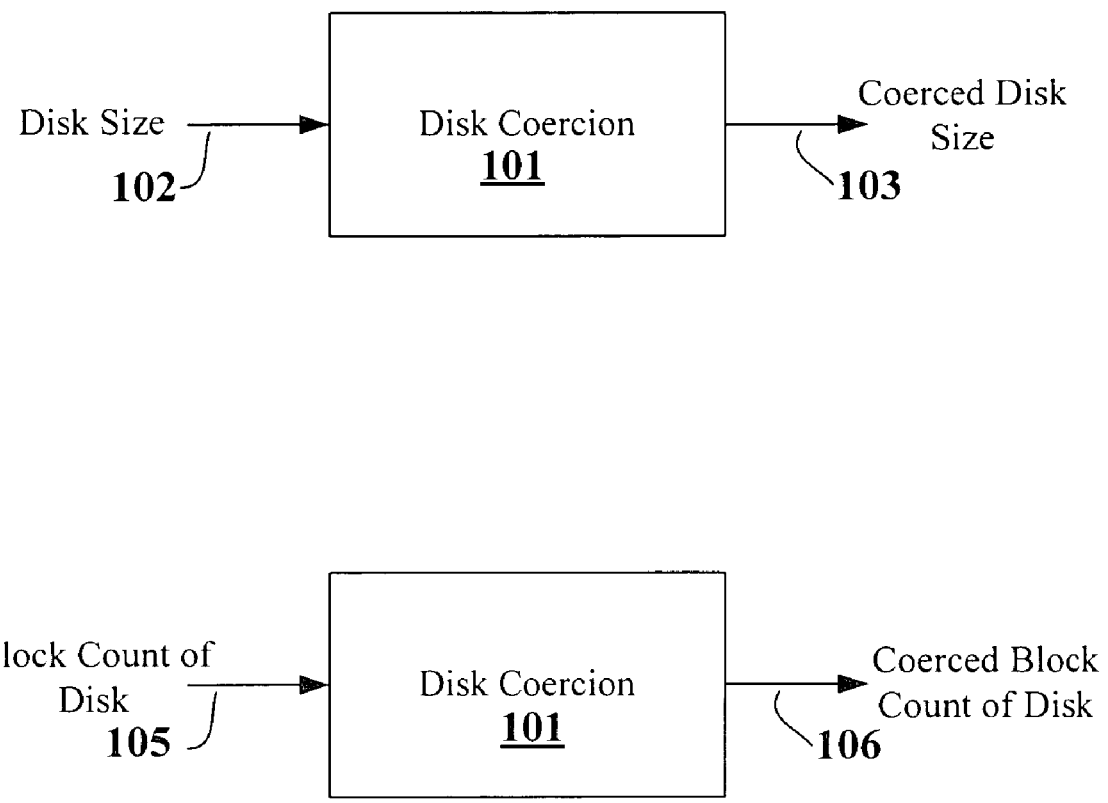
FIG. 1 generally illustrates the principles of disk drive coercion.
Figure 2:
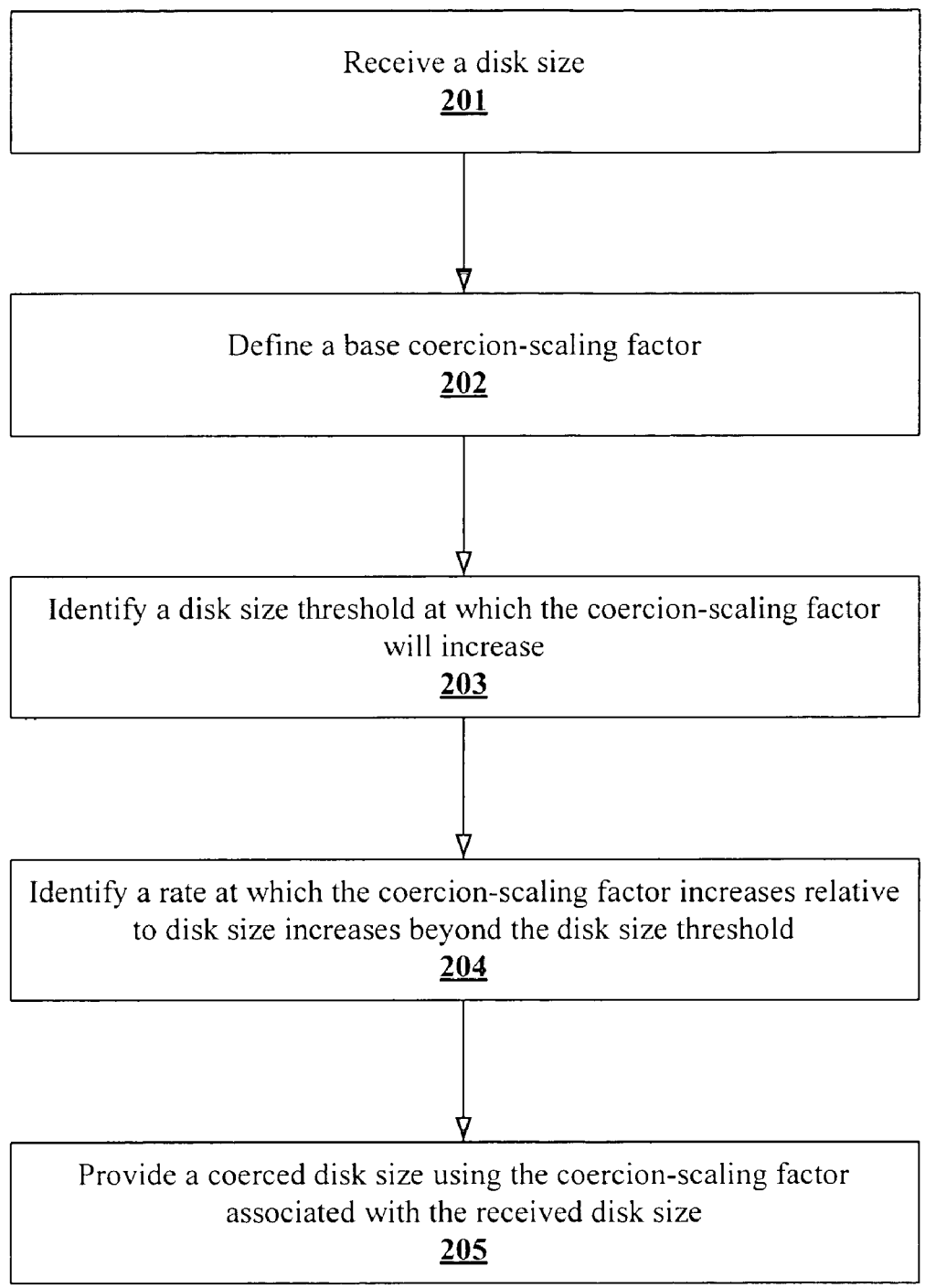
FIG. 2 is a flowchart describing the general method of disk coercion according to one embodiment of the invention.

FIG. 2 illustrates a general method for generating different coercion values to define a disk capacity within a disk array according to one embodiment of the invention. The method is initiated by receiving a labeled disk size or volume 201. This disk size may be provided as a storage size (e.g., 36 GB) or a block count of the disk. A base coercion scaling factor is defined 202 such that disks having labeled capacities above a certain limit are coerced using this base coercion scaling factor. This limit is defined as the disk size threshold 203.

A scaling factor rate is identified 204 at which the coercion scaling factor starts increasing from its base value such that for each received disk size that is greater than the threshold disk size, a corresponding coercion scaling factor is generated. This scaling factor rate may be defined by various functions including linear functions and non-linear functions, such as a step function. Finally, the received disk size may be modified to a coerced disk size using the corresponding coercion scaling factor 205.

The disk size may be received as a string of bits. In such a scenario, a bit counter may be used to identify the size of the disk, wherein the maximum logical block address of the disk drive is identified and the position of the most significant bit '1' is counted and is stored as a bit count. According to one embodiment of the present invention, the bit count may be used to identify the magnitude of the labeled disk capacity or size of the disk.

In one embodiment of the invention, a scaling factor rate is identified and the bit count is divided by the scaling factor rate to obtain an initial divisor. The scaling factor rate may be increased or decreased as or when required in order to obtain the desired coercion scaling factor. A larger scaling factor rate may cause the calculated coercion scaling factor to increase at a faster rate, while a smaller scaling factor may cause the calculated coercion value to increase at a slower rate. Furthermore, the divisor can also be increased or decreased to obtain a final divisor that can be used to create a coerced disk size as per the requirement of the required RAID volume.

The above-described embodiments of the invention provide a dynamic method for coercing disks of varying capacity. By modifying the coercion scaling factor based on the labeled disk capacity, the coercion process is more able to effectively coerce the disk without wasting too much disk capacity.

B. Scaled Coercion of Various Disk Drives

Figure 3:
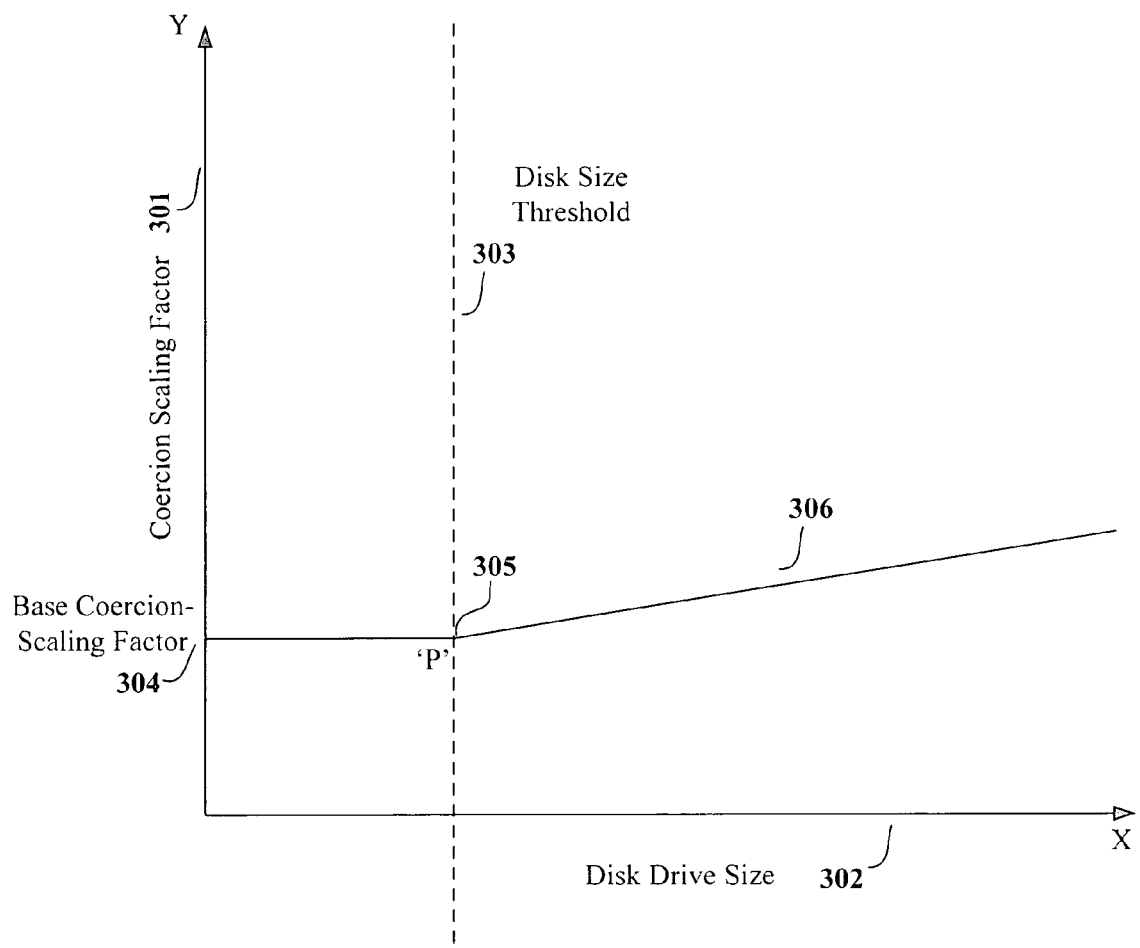
FIG. 3 shows a graph representing the linear increase in coercion rate according to one embodiment of the present invention.

As explained earlier, different values of coercion scaling factors are generated in order to coerce various disk sizes accordingly. The relationship between the coercion scaling factor and the disk drive size, as per one embodiment of the invention, can be plotted in a graph as shown in FIG. 3. The horizontal or the x-axis indicates the size of the disks 302, which are required to be coerced through one of the embodiment of the invention, whereas the coercion scaling factor 301 is given on the y-axis.

As can be seen from the graph shown in FIG. 3, a base coercion scaling factor 304 is marked. A disk size threshold 303 is also marked on the x-axis to indicate the point at which the coercion scaling factor 301 starts increasing from its base value 304. As described earlier, labeled disk sizes below the threshold value 303 are coerced using the base coercion scaling factor 304. Therefore, a straight line parallel to the x-axis can be seen in the graph. This straight line indicates that when the labeled size of the disks 302 to be coerced is smaller than the threshold value 303, the base coercion scaling factor 304 is used for the coercion. This base coercion scaling factor 304 could be increased or decreased as per the need of the user.

Point 'P' 305 on the graph indicates the instance at which the coercion scaling factor 301 increases at a rate(s) such that a corresponding coercion scaling factor is generated for each received disk size, which is larger than the disk size threshold 303. Therefore, disks with their size larger than the threshold 303 are coerced by a corresponding increased coercion scaling factor; whereas disk sizes below the threshold 303 are coerced by the base coercion scaling factor 304.

According to one embodiment of the invention, the rate 306 of increase in the coercion scaling factor is linear as shown in FIG. 3. However, one skilled in the art will recognize that the change in coercion scaling factors may be defined by numerous different functions including both linear and non-linear functions. For example, when the invention is embodied in a digital computer system or the like, having the size of the disk be inputted in the form of a bit string or block count, the rate of increase in the coercion scaling factor may be a step function 406 as shown in FIG. 4.

Figure 4:
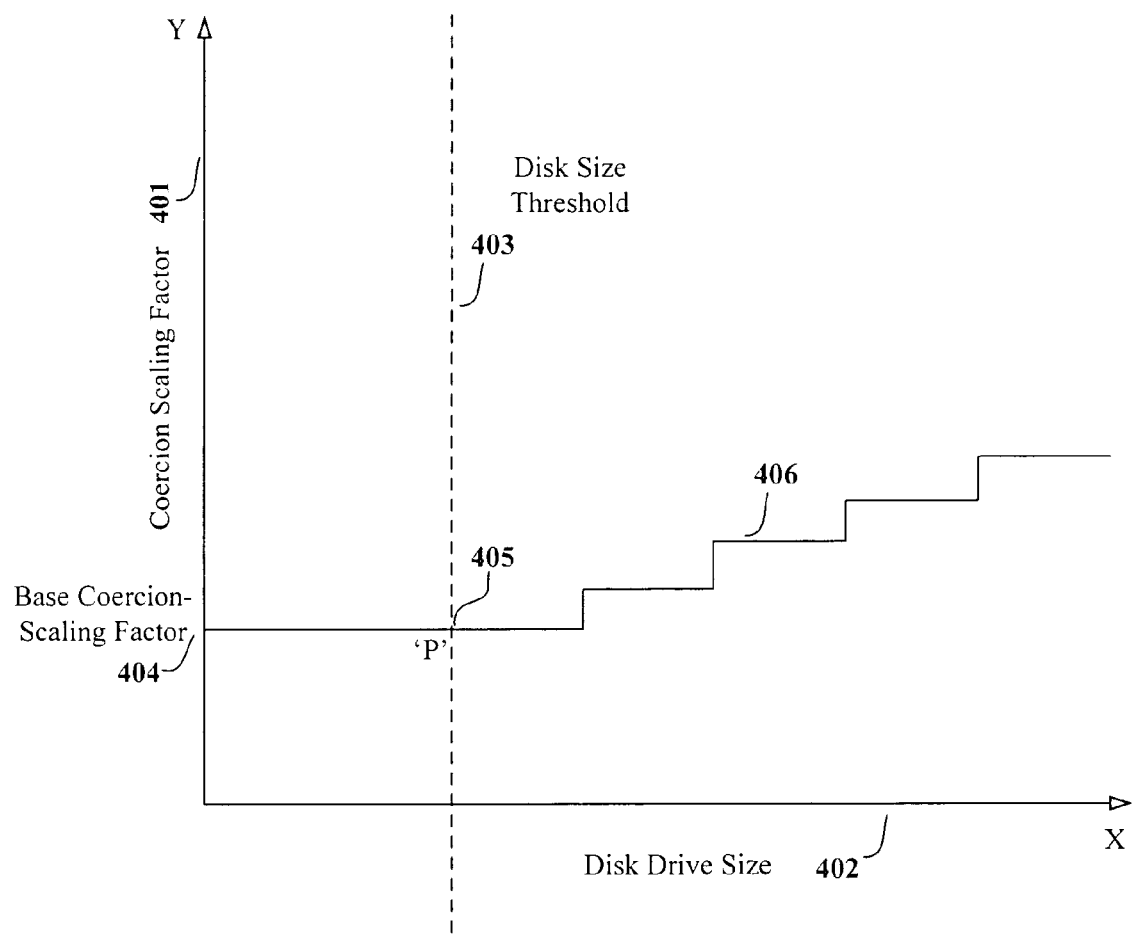
FIG. 4 is a graph representing the rate of increase in coercion factor as a step function according to another embodiment of the present invention.

Similar to the plot shown in FIG. 3, the x-axis in FIG. 4 indicates the size of the disks 402, whereas the coercion scaling factor 401 is shown on the y-axis. FIG. 4 also shows the base coercion scaling factor 404, the disk size threshold 403 and a point 'P' 405 at which the coercion scaling factor 401 starts increasing from its base value 404. The line parallel to the x-axis as shown in the graph indicates that when size of the disks to be coerced is smaller than the threshold value 403, the base-scaling factor 404 is used for the coercion. All disks which are larger than the disk size threshold 403 are coerced by the corresponding increased coercion scaling factor as explained earlier.

One skilled in the art will recognize that the characteristics of the step function may be modified. For example, the length of each step may be lengthened or shortened depending on various requirements from a user. Furthermore, the height of the step may also be modified by the user.

C. Exemplary Method of Identifying Disk Coercion Scaling Factor

Figure 5:
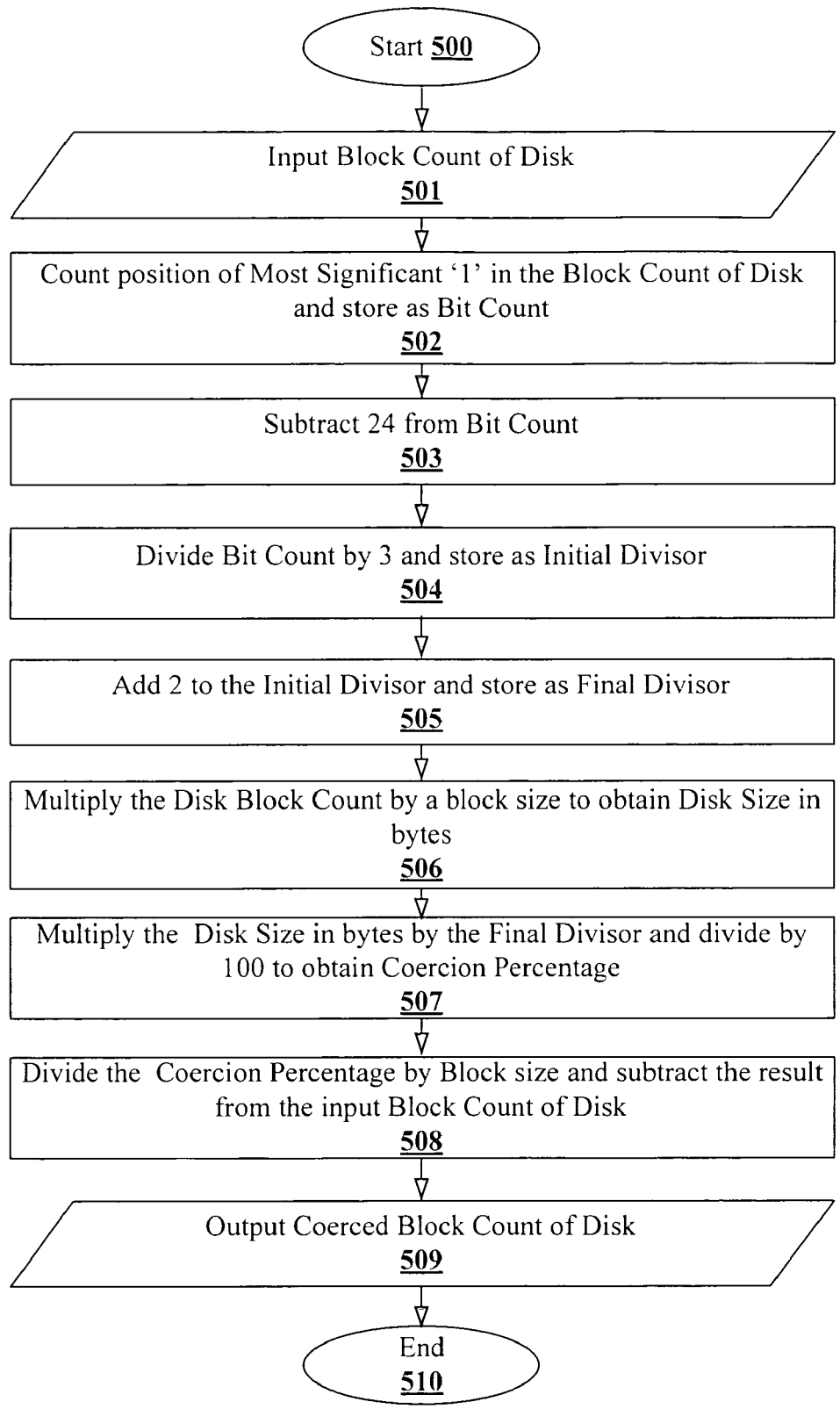
FIG. 5 is a flow chart illustrating a method for coercing the capacity of a disk drive according to one embodiment of the invention.

FIG. 5 illustrates a method for identifying a disk coercion scaling factor according to one embodiment of the invention. This particular embodiment of the invention is initiated by receiving disk size as an input, such as the labeled disk capacity or the block count of the disk 501. The capacity of the disk drive may be derived from the count of memory blocks within the disk or the maximum address location of the disk. Data within a drive is stored in specific locations and each location is given a logical address so that a controller or a host processor can access the various locations according to their unique addresses. Typically, the locations within a drive normally start from the zero address and progress to a maximum address location. From this maximum address location, the capacity or size of the disk may be determined.

In one embodiment of the invention, the address is structured in a sequence of binary bits 0's and 1's. The maximum logical address is received as the input and the position of the most significant '1' is counted and the value is stored as a "bit count" 502. The bit count is adjusted to define a base coercion scaling factor from which coercion scaling factors will increase beyond a threshold value. In one embodiment of the invention, this adjustment may be made by subtracting the number '24', which value was derived from experiment, from the bit count 503. The base coercion scaling factor can be increased or decreased in order to cause the coercion values to start at smaller or larger numbers respectively.

As previously explained, a scaling factor rate has to be selected or identified and the bit count is divided by the scaling factor rate to obtain an initial divisor. In one embodiment of the invention, the scaling factor rate is selected as '3', which was derived by experiment. The bit count is divided by 3 and stored as an initial divisor 504. The scaling factor rate may be increased or decreased as or when required in order to obtain the desired coercion rate. As shown in FIG. 5, the digit '2' is added to the initial divisor in order to obtain a final divisor 505. The final divisor is further manipulated to create a coercion scale percentage that can be used to coerce the received disk size of the RAID volume. The coercion percentage defines how much capacity will be coerced within the disk.

In one embodiment of the invention, the coercion percentage can be calculated using the disk block count and the block size. The block count of disk is multiplied by a block size (e.g., 512) to obtain the disk size in bytes 506. This disk size in bytes is further multiplied by the final divisor and the result is divided by 100 to obtain the coercion percentage 507. The coercion percentage is further used to coerce the block count. The coercion percentage is divided further by the block size and the result is subtracted from the input block count of the disk 508. Thus a coerced block count of disk is obtained 509.

One skilled in the art will recognize that various methods and techniques may be used to dynamically assign a coercion scaling factor to a disk and apply the coercion scaling factor in order to identify a coercion percentage.

The foregoing description of the invention has been described for purposes of clarity and understanding. It is not intended to limit the invention to the precise form disclosed. Various modifications may be possible within the scope and equivalence of the appended claims.

We claim:

1. A method for coercing the size of disks having different labeled capacities, the method comprising:
   defining a base coercion scaling factor that remains constant until a disk size threshold is reached;
   increasing a coercion scaling factor rate beyond the disk size threshold relative to an increase in labeled disk capacity;
   associating a coercion scaling factor of a disk according to the disk's labeled capacity; and
   applying the coercion scaling factor to the disk to reduce the amount of available capacity on the disk when integrated within a system.

2. The method of claim 1 wherein the disk is integrated within a redundant array of independent disks.

3. The method of claim 1 wherein the coercion scaling factor rate increases according to a mathematical function.

4. The method of claim 3 wherein the mathematical function is a linear function.

5. The method of claim 3 wherein the mathematical function is a non-linear function.

6. The method of claim 5 wherein the non-linear mathematical function is a step function.

7. The method of claim 1 further comprising the step of providing a labeled disk capacity for the disk.

8. The method of claim 7 wherein the labeled disk capacity is provided in bit sequence identifying a maximum block count in the disk.

9. The method of claim 1 wherein the base coercion scaling factor is defined by an initial divisor derived from the labeled disk capacity.

10. The method of claim 9 wherein the initial divisor is calculated by subtracting a first value from a block count of the disk.

11. The method of claim 10 wherein a final divisor by adding a second value to the initial divisor.

12. The method of claim 11 wherein a coercion percentage is derived from the final divisor and the coercion scaling factor.

13. An apparatus for calculating a coercion percentage for disk capacity, the apparatus comprising:
   an input coupled to receive a labeled disk capacity relating to a disk;

a disk coercion module implemented in hardware, coupled to receive tile labeled disk capacity, that determines a coercion percentage for the disk;

an output that provides the coercion percentage for the disk; and wherein the coercion percentage dynamically changes in relation to the size of the labeled disk capacity.

14. The apparatus of claim 13 wherein the disk coercion module provides a coercion scaling factor that remains constant until the labeled disk capacity exceeds a disk size threshold.

15. The apparatus of claim 14 wherein the disk coercion module provides a coercion scaling factor that increases relative to increased labeled disk capacity beyond the disk size threshold.

16. The apparatus of claim 15 wherein the rate of increase of the coercion scaling faction is defined by a step function.

17. The apparatus of claim 13 wherein the labeled disk capacity is provided in a disk block count.

18. A computer program product embodied on a computer readable medium for applying at least one compliant transfer function to a real-time signal, the computer program product comprising computer instructions for:

defining a base coercion scaling factor that remains constant until a disk size threshold is reached;

increasing a coercion scaling factor rate beyond the disk size threshold relative to an increase in labeled disk capacity;

associating a coercion scaling factor of a disk according to the disk's labeled capacity; and applying the coercion scaling factor to the disk to reduce the amount of available capacity on the disk when integrated within a system.

19. The computer program product of claim 18 wherein the increase in the coercion scaling factor rate is defined by a mathematical function.

20. The computer program product of claim 19 wherein the mathematical function is a linear function.

21. The computer program product of claim 18 wherein the mathematical function is a step function.

22. The computer program product of claim 18 wherein the labeled disk capacity is provided in bit sequence identifying a maximum block count in the disk.

* * * * *